UNITED STATES PATENT OFFICE.

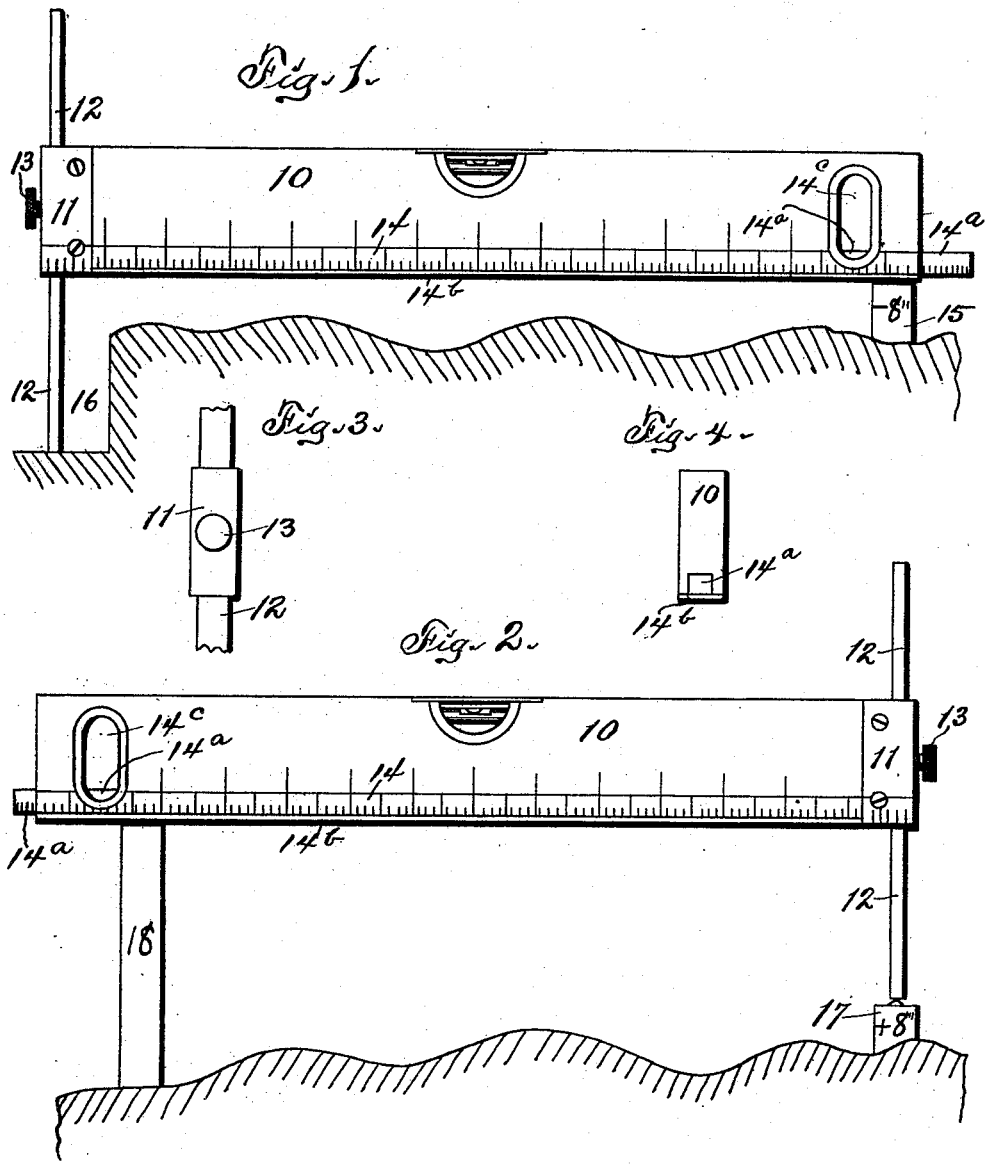

THEODORE S. DE LAY, OF CRESTON, IOWA.

LEVEL AND RULE MEASURING INSTRUMENT.

1,274,696.    Specification of Letters Patent.    Patented Aug. 6, 1918.

Application filed June 11, 1917. Serial No. 173,955.

*To all whom it may concern:*

Be it known that I, THEODORE S. DE LAY, a citizen of the United States of America, and resident of Creston, in the county of Union and State of Iowa, have invented a new and useful Level and Rule Measuring Instrument, of which the following is a specification.

The object of this invention is to provide means for quickly, easily and somewhat accurately determining the horizontal distance between and the relative elevation of two points which are in different horizontal planes, such as in setting curb or sidewalk grades from grade stakes not set to grade, the proper grade being determined by a given measurement above or below the stake.

A further object of this invention is to provide an improved tool combining a level and measuring stick or rule.

A further object of this invention is to provide an improved tool combining a level and two measuring sticks or rules mounted adjustably and at right angles to each other.

A further object of this invention is to provide a convenient means of adjustment and connection between a level and rule.

A further object of this invention is to combine a level and measure thereon with a measuring stick or rule adjustable longitudinally of said level and forming a continuation or extension of said measure.

A further object of this invention is to combine a level and measure thereon with a measuring stick or rule and means for adjustably connecting said rule and level substantially at right angles to each other.

My invention consists in the construction, arrangement and combination of elements, hereinafter set forth, pointed out in my claims and illustrated by the accompanying drawing, in which—

Figure 1 is an elevation of the device illustrating the manner of its use in determining a grade in a plane below the horizontal plane of the top of a grade stake.

Fig. 2 is an elevation of the device from the opposite side and illustrating the manner of its use in determining a grade in a plane above the horizontal plane of the top of a grade stake.

Figs. 3 and 4 are elevations of opposite ends of the tool.

In the construction of the tool as shown the numeral 10 designates generally a hand level of common form used by carpenters, masons and mechanics generally. A slide bearing 11 is mounted on and embraces one end portion of and is spaced from the level 10. A measuring stick or rule 12 of approximately rigid character is mounted slidingly between the bearing 11 and adjacent end of the level 10, and said rule is held in any position in which it is placed manually by a set screw or other compression device 13, seated in the bearing and engaging the rule. The rule 12 preferably is arranged at right angles to and may project at either end from the upper and lower faces of the level. A measure or rule 14 is fixed to or formed or imprinted on either or both sides of the level near to a lower edge thereof. Another measure, preferably a measuring stick or rule 14$^a$, is slidingly mounted in a longitudinal groove formed in the lower face of the level and is held in place by a plate 14$^b$ fixed to said lower face. The groove in which the stick 14$^a$ is mounted intersects a hole or aperture 14$^c$ so that the stick 14$^a$ may be adjusted longitudinally by fingers of the user inserted in said hole. The measuring stick or rule 14$^a$ forms a continuation or extension of the measure 14 at times.

In practical use, to determine a grade in a horizontal plane below the ground surface at a grade stake such as 15, which in this instance is marked —8″, the rule 12 is set to extend beyond the lower face of the level 8 inches. Then an excavation 16 is made, if necessary, at the desired distance laterally from the grade stake 15 to such extent that the level 10 may be supported, in approximately level position as self-indicated, at one end by said grade stake and at the other end by the rule, the latter resting on the bottom of the excavation.

To determine a grade in a horizontal plane above the ground surface at a grade stake such as 17, which in this instance is marked +8″, the rule 12 is set to extend beyond the lower face of the level 10 eight inches. Then a temporary stake 18 is set at a point laterally removed from the stake 17 at such an elevation that it will support one end of the level, in approximately level position as self-indicated, the other end of the level being carried by the rule resting on the top of the grade stake 17.

In either instance, the horizontal distance between the grade stake, 15 or 17, and any other point in the length of the level 10, may be read on the rule 14 on either side of said level.

When the horizontal distance between the grade stake and the point of rest of the other end of the level, such as on the rule 12 or stake 18, is too great to be compassed by the length of the level, the stick or rule 14ª may be extended from the level and be employed as an extension of said level to provide support for one end thereof. In such position the horizontal distance may be read on the measure 14 plus the extended portion of the rule 14ª.

The rule 12 may be removed from the bearing 11 and be placed parallel with the level 10 for convenience in transporting or packing.

I claim as my invention—

1. Means for determining the horizontal distance between and the relative elevation of two points which are in different horizontal planes, comprising a level, said level being provided with indices of linear measurement, a rule, and means for mounting said rule adjustably on and adapted for movement in a plane at right angles to said level.

2. The combination of a bar level formed with a slide-bearing in and extending from end to end of its bar, a rule slidingly mounted in and adapted to project at one end only from said bearing, there being a handhole through the bar of said level and intersecting said bearing, said rule extending laterally into said hole.

3. The combination of a bar level having a measure on one or more of the faces of its bar and extending from end to end thereof, said level being formed with a slide-bearing in and extending from end to end of its bar, a rule mounted and adjustable slidingly in said bearing and adapted to project at one end only therefrom and forming at times an extension of said measure on the level bar, and another rule mounted transversely of, on and extending across the level bar, and also extending across the measure thereon and the first rule.

THEODORE S. DE LAY.

Copies of this patent may be obtained for five cents each, by addressing the "Commissioner of Patents, Washington, D. C."